July 26, 1938.                F. A. WRIGHT                2,124,809
                           STRUCTURAL GLASS
                          Filed Aug. 14, 1937
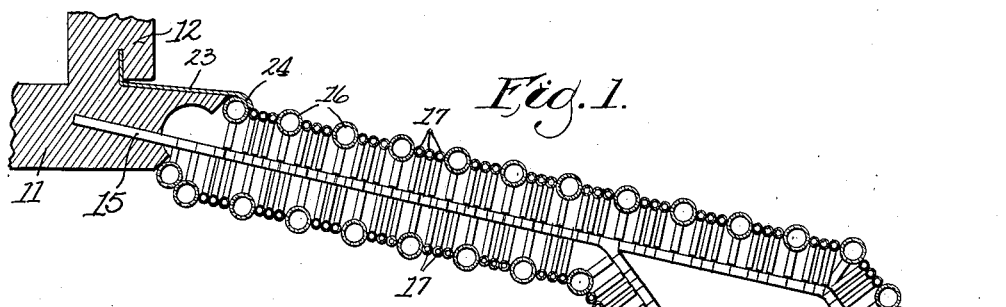
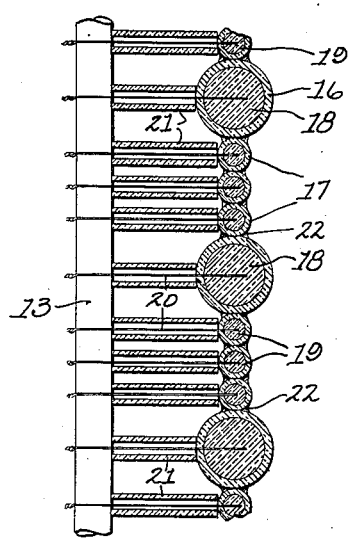
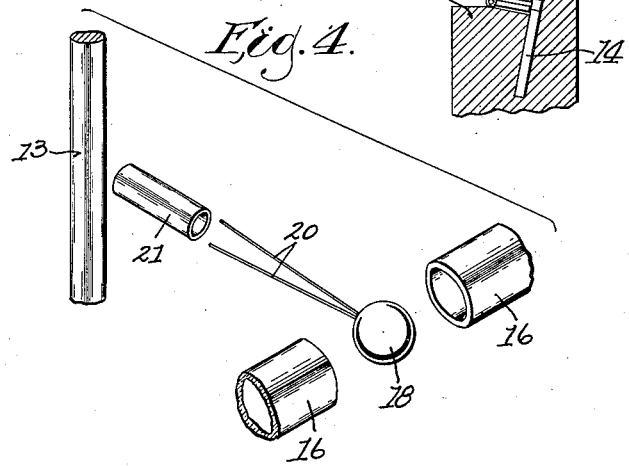
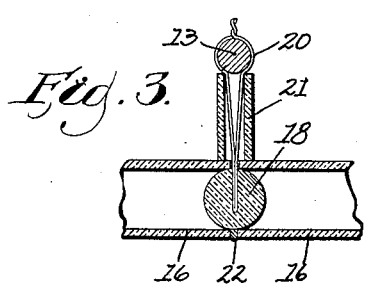
INVENTOR
FRANK LLOYD WRIGHT
BY
*Gerald P. Welch*
ATTORNEY Patented July 26, 1938

2,124,809

UNITED STATES PATENT OFFICE 2,124,809

STRUCTURAL GLASS

Frank Lloyd Wright, Spring Green, Wis., assignor of forty-nine per cent to S. C. Johnson & Son, Inc., Racine, Wis., a corporation of Wisconsin Application August 14, 1937, Serial No. 159,117

7 Claims. (Cl. 72—0.5)

This invention relates to structural glass and more particularly to a novel form of structural glass assembly composed of tubular and ball elements.

An object of the invention is to provide structural glass elements which will have a broader utility for modification than is possible with structural glass units now in use, such as glass bricks, panes or the like.

Another object of the invention is to provide glass elements which may readily be assembled in a variety of planes and forms which are impossible with the use of glass bricks or the like.

Another object of the invention is to provide structural glass assemblies capable of a higher degree of architectural beauty than is possible with glass elements now in use.

Another object of the invention is to provide novel glass structural elements of round and tubular form and novel means for anchoring the same to a building structure.

Other and further objects of the invention will appear as the description proceeds, reference being had to the accompanying drawing, in which:—

Fig. 1 is a view partly in elevation and partly in section of a structural glass assembly embodying my invention.

Fig. 2 is a fragmentary sectional view through a plurality of glass and tubular members and the spacer tubes showing a building brace and wire securing means in elevation.

Fig. 3 is a fragmentary sectional view showing one means of wiring the assembly to a building structure.

Fig. 4 is a fragmentary detail view in perspective of the elements making up this invention.

Referring more particularly to the drawing, the numeral 10 represents a vertical wall of a building structure, with the numbers 11 and 12 indicating respectively the roof and parapet of the same. In the form of the invention shown, a skeleton brace structure, 13, is embedded or otherwise secured at 14 of the wall, 10, and at 15 of the roof, 11. It will be understood that the brace structure, 13, may take a wide variety of forms according to choice. The structure illustrated shows a plurality of tubular elements of large diameter, 16, and a plurality of tubular elements having a relatively smaller diameter, 17, and it is not intended to limit the invention to any given size relationship as to the tubular or other elements employed.

In the form of the invention shown in Figure 1, two rows of tubular elements are employed, one interiorly and the other exteriorly of the brace structure, 13. The tubular elements, 16 and 17, are necessarily of a limited length and at the junctures of aligned sections of tubing a plurality of ball members, 18 and 19, are interposed. The balls, 18 and 19, are preferably formed of glass and have embedded centrally therein the wire securing means, 20, which may be either a single strand or a pair of strands, 20, as shown in Figure 3. The balls, 18, are of such a size as to fit easily within the bore of the large tubular members, 16, and the balls, 19, are of such a size as to fit easily within the related tubes, 17.

Spacer tubes, 21, are provided for enclosing the wire securing means, 20, and for maintaining the ball and tube assemblies at a given distance from the brace members, 13. Plastic or binding material, 22, is interposed at the junctions of the tubes and related balls and also longitudinally of adjacent tubes inwardly and outwardly thereof throughout the assembly. In this manner a substantial and rigid assembly is achieved. A flashing, 23, extending from the base of the parapet, 12, may be bent around the top tubular member, 16, at 24 as shown.

It will be understood that the tubular elements may be opaque, translucent or relatively transparent and may be formed of materials other than glass where it is desired to obscure light rather than to admit it.

It will also be understood that the device is capable of many modifications in structure and design without departing from the spirit of the invention, all within the scope of the appended claims.

Having thus described my invention, what I claim and desire to secure by Letters Patents of the United States, is:—

1. In a building structure, a frame, a plurality of tubular elements, a plurality of ball elements interposed separately within the junctures of said tubular elements, plastic material uniting the elements, and means connecting said ball elements to said frame for securing thereto said tubular and ball elements.

2. In a building structure, a frame, a plurality of tubular elements arranged parallelly, a plurality of ball elements interposed separately within at the junctures of said tubular elements, plastic material uniting the abutting ends of the tubular elements and means connecting said ball elements to said frame for securing thereto said tubular and ball elements.

3. In a building structure a plurality of tubular elements, a plurality of ball elements interposed separately within junctures of said tubular elements, mastic material uniting the elements at said junctures, and wire means for securing the assembly to said building structure.

4. In a building structure, a plurality of tubular elements, a plurality of ball elements held within registering ends of said tubular elements, means connected to said ball elements and securing the assembly to said building structure, means enveloping said securing means for spacing the assembly from said structure, and mastic material uniting the elements at their points of contact.

5. In a building structure, a plurality of tubular elements, a plurality of ball elements held within registering ends of said tubular elements, wire means connected to said ball elements for securing the assembly to said building structure, means enveloping said wire means and spacing the assembly from said structure, and mastic material uniting the elements at their points of contact.

6. In a building structure a plurality of tubular elements, a plurality of ball elements held within registering ends of said tubular elements, wire means integral with said ball elements and securing the assembly to said building structure, means enveloping said wire means and spacing the assembly from said structure, and mastic material uniting the elements at their contacting surfaces.

7. In a building structure a plurality of glass tubular elements, a plurality of glass ball elements held within registering ends of said tubular elements, wire means integral with said ball elements and securing the assembly to said building structure, glass tubular means enveloping said wire means and spacing the assembly from said building structure, and mastic material uniting the tubular elements with each other and with the ball elements to form a unitary structure.

FRANK LLOYD WRIGHT.